US011555770B2

(12) United States Patent
Trainoff

(10) Patent No.: US 11,555,770 B2
(45) Date of Patent: Jan. 17, 2023

(54) DETERMINING INTRINSIC VISCOSITY AND HUGGINS CONSTANT OF AN UNKNOWN SAMPLE

(71) Applicant: Wyatt Technology Corporation, Goleta, CA (US)

(72) Inventor: Steven P. Trainoff, Santa Barbara, CA (US)

(73) Assignee: WYATT TECHNOLOGY CORPORATION, Goleta, CA (US)

( * ) Notice: Subject to any disclaimer, the term of this patent is extended or adjusted under 35 U.S.C. 154(b) by 229 days.

(21) Appl. No.: 16/840,478

(22) Filed: Apr. 6, 2020

(65) Prior Publication Data
US 2021/0310921 A1    Oct. 7, 2021

(51) Int. Cl.
*G01J 5/02*       (2022.01)
*G01N 11/08*      (2006.01)
*G01N 21/3577*    (2014.01)
*G01N 21/47*      (2006.01)
*G01N 21/41*      (2006.01)
*G01N 21/64*      (2006.01)
(Continued)

(52) U.S. Cl.
CPC ............. *G01N 11/08* (2013.01); *G01N 21/33* (2013.01); *G01N 21/3577* (2013.01); *G01N 21/41* (2013.01); *G01N 21/47* (2013.01); *G01N 21/64* (2013.01); *G06F 17/13* (2013.01)

(58) Field of Classification Search
CPC .... G01N 11/08; G01N 21/33; G01N 21/3577; G01N 21/41; G01N 21/47; G01N 21/64; G01N 21/31; G01N 2021/4146; G06F 17/13
See application file for complete search history.

(56) References Cited

U.S. PATENT DOCUMENTS

2017/0189444 A1    7/2017    Ismagilov et al.
2017/0198575 A1    7/2017    Sandor et al.
2020/0040141 A1    2/2020    Kornfield et al.

FOREIGN PATENT DOCUMENTS

JP    2005091368 A  *  4/2005  ......... G01N 30/8624

OTHER PUBLICATIONS

Written Opinion for PCT/US2021/026061, dated Jun. 29, 2021.
International Search Report PCT/US2021/026061, dated Jun. 29, 2021.

* cited by examiner

*Primary Examiner* — Kiho Kim
(74) *Attorney, Agent, or Firm* — Leonard T. Guzman

(57) ABSTRACT

The present disclosure describes a computer implemented method, a system, and a computer program product of determining intrinsic viscosity and Huggins constant of an unknown sample. In an embodiment, the method, system, and computer program product include receiving concentration detector signal values over time from a concentration detector corresponding to a series of aliquots of an unknown sample injected into an instrument chain, receiving specific viscosity values over time from a viscometer corresponding to the series of aliquots, calculating a total mass of each of the aliquots, calculating a first intermediate viscosity value of each of the aliquots, calculating a second intermediate viscosity value of each of the aliquots, and fitting the total mass, the first intermediate viscosity value, and the second intermediate viscosity value to a fitting, resulting in a calculated intrinsic viscosity of the unknown sample and a calculated Huggins constant of the unknown sample.

20 Claims, 15 Drawing Sheets

(51) Int. Cl.
*G01N 21/33* (2006.01)
*G06F 17/13* (2006.01)

| | in | in2 | mass |
|---|---|---|---|
| | 0.00870625 | 0.000254086 | 0.001066775 |
| | 0.00687925 | 0.000164706 | 0.000859931 |
| | 0.00596391 | 0.000124856 | 0.000752737 |
| | 0.00505594 | 0.000091349 | 0.000646061 |
| | 0.00415924 | 0.000062811 | 0.000537783 |
| | 0.00327247 | 0.000039234 | 0.000431139 |
| | 0.00244348 | 0.000021582 | 0.000322252 |

| | Estimate | Standard Error | t-Statistic | P-Value |
|---|---|---|---|---|
| iv | 7.32252 | 0.0251811 | 290.794 | $9.12691 \times 10^{-12}$ |
| k | 3.51932 | 0.134022 | 26.2591 | $1.49684 \times 10^{-6}$ |

FOM = 0.0310853

FIG. 6C

DETERMINING INTRINSIC VISCOSITY AND HUGGINS CONSTANT OF AN UNKNOWN SAMPLE

BACKGROUND

The present disclosure relates to samples, and more specifically, to determining intrinsic viscosity and Huggins constant of an unknown sample.

SUMMARY

The present disclosure describes a computer implemented method, a system, and a computer program product of determining intrinsic viscosity and Huggins constant of an unknown sample. In an exemplary embodiment, the computer implemented method, the system, and the computer program product include (1) receiving, by a computer system, concentration detector signal values over time, $c_{meas}(t)$, from a concentration detector, where the concentration detector signal values correspond to concentration values of a series of aliquots of an unknown sample injected into an instrument chain, where the instrument chain includes the concentration detector, (2) receiving, by the computer system, specific viscosity values over time, $\eta_{sp}(t)$, from a viscometer, where the specific viscosity values correspond to the series of aliquots, where the instrument chain further includes the viscometer, (3) executing, by the computer system, a set of logical operations calculating a total mass of each of the aliquots, $m_i$, as a first integral function of the received concentration detector signal values, $c_{meas}(t)$, corresponding to the each of the aliquots, (4) executing, by the computer system, a set of logical operations calculating a first intermediate viscosity value of the each of the aliquots, $I\eta_i$, as a second integral function of the received specific viscosity values, $\eta_{sp}(t)$, corresponding to the each of the aliquots, (5) executing, by the computer system, a set of logical operations calculating a second intermediate viscosity value of the each of the aliquots, $I2\eta_i$, as a third integral function of the received specific viscosity values, $\eta_{sp}(t)$, corresponding to the each of the aliquots, and (6) executing, by the computer system, a set of logical operations fitting the total mass of the each of the aliquots, $m_i$, the first intermediate viscosity value of the each of the aliquots, $I\eta_i$, and the second intermediate viscosity value of the each of the aliquots, $I2\eta_i$, to a fitting function comprising the first integral function, a floating intrinsic viscosity of the unknown sample, $[\eta]$, the second integral function, a floating Huggins constant of the unknown sample, $K_h$, and the third integral function, resulting in a calculated intrinsic viscosity of the unknown sample and a calculated Huggins constant of the unknown sample.

BRIEF DESCRIPTION OF THE DRAWINGS

FIG. 6C depicts data in accordance with an embodiment.

DETAILED DESCRIPTION

Figure 1A:
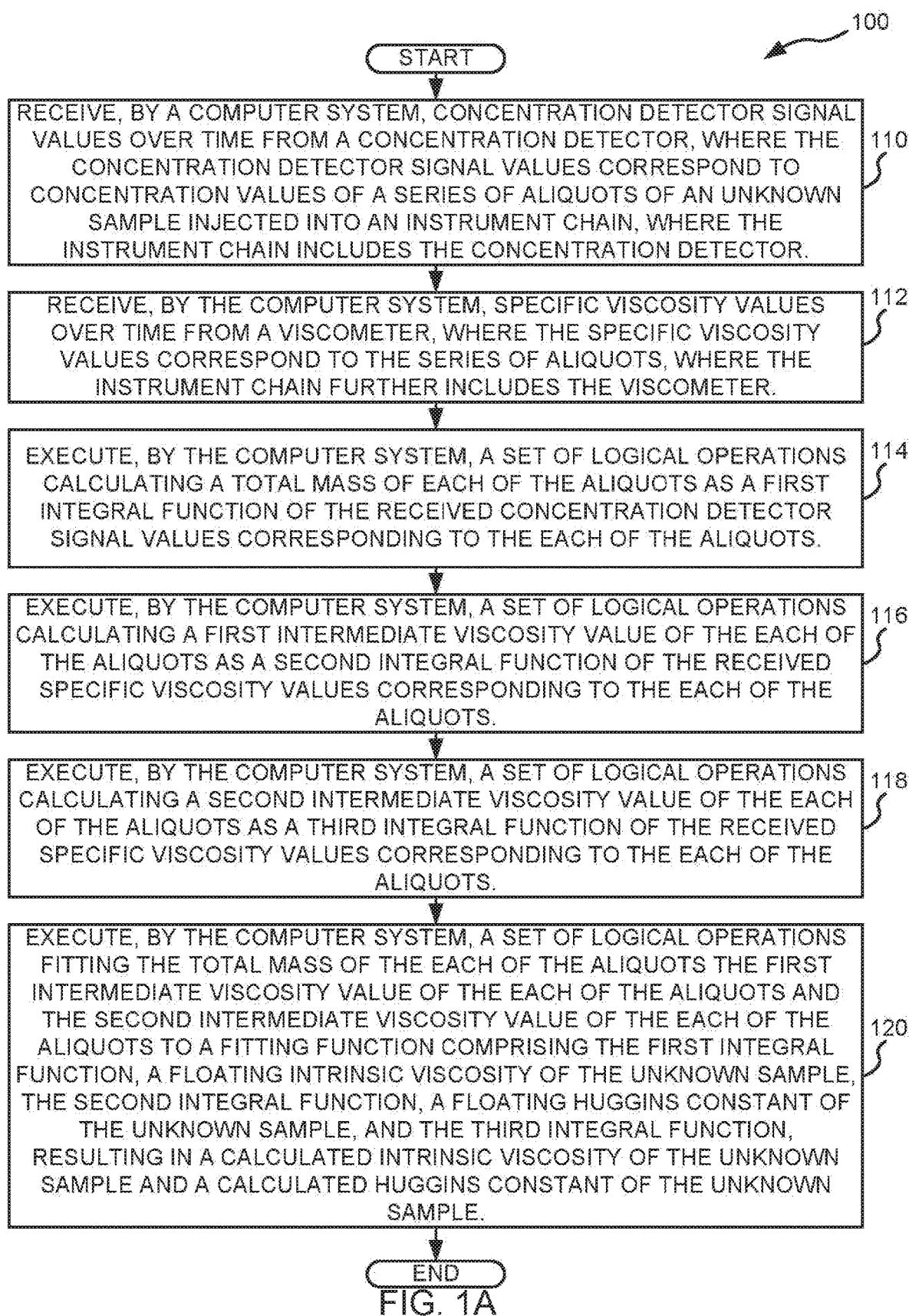
FIG. 1A depicts a flowchart in accordance with an exemplary embodiment.

The present disclosure describes a computer implemented method, a system, and a computer program product of determining intrinsic viscosity and Huggins constant of an unknown sample. In an exemplary embodiment, the computer implemented method, the system, and the computer program product include (1) receiving, by a computer system, concentration detector signal values over time, $c_{meas}(t)$, from a concentration detector, where the concentration detector signal values correspond to concentration values of a series of aliquots of an unknown sample injected into an instrument chain, where the instrument chain includes the concentration detector, (2) receiving, by the computer system, specific viscosity values over time, $\eta_{sp}(t)$, from a viscometer, where the specific viscosity values correspond to the series of aliquots, where the instrument chain further includes the viscometer, (3) executing, by the computer system, a set of logical operations calculating a total mass of each of the aliquots, $m_i$, as a first integral function of the received concentration detector signal values, $c_{meas}(t)$, corresponding to the each of the aliquots, (4) executing, by the computer system, a set of logical operations calculating a first intermediate viscosity value of the each of the aliquots, $I\eta_i$, as a second integral function of the received specific viscosity values, $\eta_{sp}(t)$, corresponding to the each of the aliquots, (5) executing, by the computer system, a set of logical operations calculating a second intermediate viscosity value of the each of the aliquots, $I2\eta_i$, as a third integral function of the received specific viscosity values, $\eta_{sp}(t)$, corresponding to the each of the aliquots, and (6) executing, by the computer system, a set of logical operations fitting the total mass of the each of the aliquots, $m_i$, the first intermediate viscosity value of the each of the aliquots, $I\eta_i$, and the second intermediate viscosity value of the each of the aliquots, $I2\eta_i$, to a fitting function comprising the first integral function, a floating intrinsic viscosity of the unknown sample, $[\eta]$, the second integral function, a floating Huggins constant of the unknown sample, $K_h$, and the third integral function, resulting in a calculated intrinsic viscosity of the unknown sample and a calculated Huggins constant of the unknown sample.

In an embodiment, the concentration detector is one of a differential refractive index detector (dRI), an ultraviolet absorption detector, a visual absorption detector, an infrared absorption detector, a fluorescence detector, and an evaporative light scattering detector (ELSD). In an specific embodiment, the concentration detector is a differential refractive index detector (dRI). In an embodiment, the viscometer is a differential viscometer. In an embodiment, the instrument chain includes a thermal transport measurement device. In an embodiment, the instrument chain includes a mass flow meter.

In an embodiment, the computer implemented method, the system, and the computer program product enable calculating the intrinsic viscosity and the Huggins constant of an unknown sample via a concentration detector serially connected to a concentration detector. In an embodiment, the computer implemented method, the system, and the computer program product enable calculating the intrinsic viscosity and the Huggins constant of small volumes of an unknown sample via a concentration detector serially connected to a concentration detector.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Concentration Detector

Differential Refractive Index Detector

A differential refractive index detector (dRI), or differential refractometer, or refractive index detector (RI or RID), is a detector that measures the refractive index of an analyte relative to the solvent. They are often used as detectors for high-performance liquid chromatography and size exclusion chromatography. dRIs are considered to be universal detectors because they can detect anything with a refractive index different from the solvent, but they have low sensitivity. When light leaves one material and enters another it bends, or refracts. The refractive index of a material is a measure of how much light bends when it enters.

A differential refractive index detector contain a flow cell with the following two parts: one for the sample; and one for the reference solvent. The dRI measures the refractive index of both components. When only solvent is passing through the sample component, the measured refractive index of both components is the same, but when an analyte passes through the flow cell, the two measured refractive indices are different. The difference appears as a peak in the chromatogram. Differential refractive index detectors are often used for the analysis of polymer samples in size exclusion chromatography. A dRI could output a concentration detector signal value corresponding to a concentration value of a sample.

Ultraviolet-visible Spectroscopy

Ultraviolet-visible spectroscopy or ultraviolet-visible spectrophotometry (UV-Vis or UV/Vis) refers to absorption spectroscopy or reflectance spectroscopy in the ultraviolet-visible spectral region. An ultraviolet-visible detector/ultraviolet-visible spectrophotometer uses light in the visible and adjacent ranges, where the absorption or reflectance in the visible range directly affects the perceived color of the chemicals involved, where in this region of the electromagnetic spectrum, atoms and molecules undergo electronic transitions. Such absorption spectroscopy measures transitions from the ground state to the excited state. An ultraviolet-visible detector/ultraviolet-visible spectrophotometer measures the intensity of light passing through a sample (I), and compares it to the intensity of light before it passes through the sample ($I_o$), where the ratio $I/I_o$ is called the transmittance, and is usually expressed as a percentage (% T). The absorbance, A, is based on the transmittance according to $A=-\log(\% T/100\%)$ The UV-visible spectrophotometer can also be configured to measure reflectance, where the spectrophotometer measures the intensity of light reflected from a sample (I), and compares it to the intensity of light reflected from a reference material ($I_o$), where the ratio $I/I_o$ is called the reflectance, and is usually expressed as a percentage (% R). An ultraviolet absorption detector could output a concentration detector signal value corresponding to a concentration value of a sample.

Viscometer

A capillary bridge viscometer (VIS) is an instrument used to measure the specific viscosity of a solute in a suitable solvent. The specific viscosity is defined as $\eta_{sp}=\eta/\eta_o-1$, where $\eta$ is the viscosity of the sample and $\eta_o$ is the viscosity of the solvent. As a sample is introduced into the bridge viscometer, a pressure transducer generates a signal indicative of a pressure differential. This pressure differential, combined with a predetermined internal pressure of the system, is used to calculate the specific viscosity of the sample. The specific viscosity is useful in determining the molecular parameters of a polymer including molar mass and hydrodynamic radius.

The differential pressure transducer in a capillary bridge viscometer measures the differential pressure generated across fluid arms. The instrument measures the differential pressure values continuously while flowing fluid through the system. When pure solvent flows through the system and the bridge is balanced, the differential pressure measured should be zero. Impurities in the solvent, undissolved air bubbles, electrical noise, or micro leaks in the plumbing could cause undesired noise in the differential pressure measurement, which ultimately is used to determine the specific viscosity.

Current Technologies

Current technologies could calculate the intrinsic viscosity and the Huggins constant of large volumes of an unknown sample. However, such large volumes of sample may not be practical or cost effective in certain applications, such as pharmaceutical formulations of antibody drugs. In the early stages of pharmaceutical formulation/drug discovery, proteins may be generated in small volumes and relatively low concentrations (<10 mg/ml). When the drug is formulated for clinical use, the proteins may have high concentrations (100-200 mg/ml).

There is a need to calculate the intrinsic viscosity and the Huggins constant of small volumes of an unknown sample via a concentration detector serially connected to a concentration detector.

Referring to FIG. 1A, in an exemplary embodiment, the computer implemented method, the system, and the computer program product are configured to perform an operation 110 of receiving, by a computer system, concentration detector signal values over time, $c_{meas}(t)$, from a concentration detector, where the concentration detector signal values correspond to concentration values of a series of aliquots of an unknown sample injected into an instrument chain, where the instrument chain includes the concentration detector, an operation 112 of receiving, by the computer system, specific viscosity values over time, $\eta_{sp}(t)$, from a viscometer, where the specific viscosity values correspond to the series of aliquots, where the instrument chain further includes the viscometer, an operation 114 of executing, by the computer system, a set of logical operations calculating a total mass of each of the aliquots, $m_i$, as a first integral function of the received concentration detector signal values, $c_{meas}(t)$, corresponding to the each of the aliquots, an operation 116 of executing, by the computer system, a set of logical operations calculating a first intermediate viscosity value of the each of the aliquots, $I\eta_i$, as a second integral function of the received specific viscosity values, $\eta_{sp}(t)$, corresponding to the each of the aliquots, an operation 118 of executing, by the computer system, a set of logical operations calculating a second intermediate viscosity value of the each of the aliquots, $I2\eta_i$, as a third integral function of the received specific viscosity values, $\eta_{sp}(t)$, corresponding to the each of the aliquots, and an operation 120 of executing, by the computer system, a set of logical operations fitting the total mass of the each of the aliquots, $m_i$, the first intermediate viscosity value of the each of the aliquots, $I\eta_i$, and the second intermediate viscosity value of the each of the aliquots, $I2\eta_i$, to a fitting function comprising the first integral function, a floating intrinsic viscosity of the unknown sample, $[\eta]$, the second integral function, a floating Huggins constant of the unknown sample, $K_h$, and the third integral function, resulting in a calculated intrinsic viscosity of the unknown sample and a calculated Huggins constant of the unknown sample.

Figure 8:
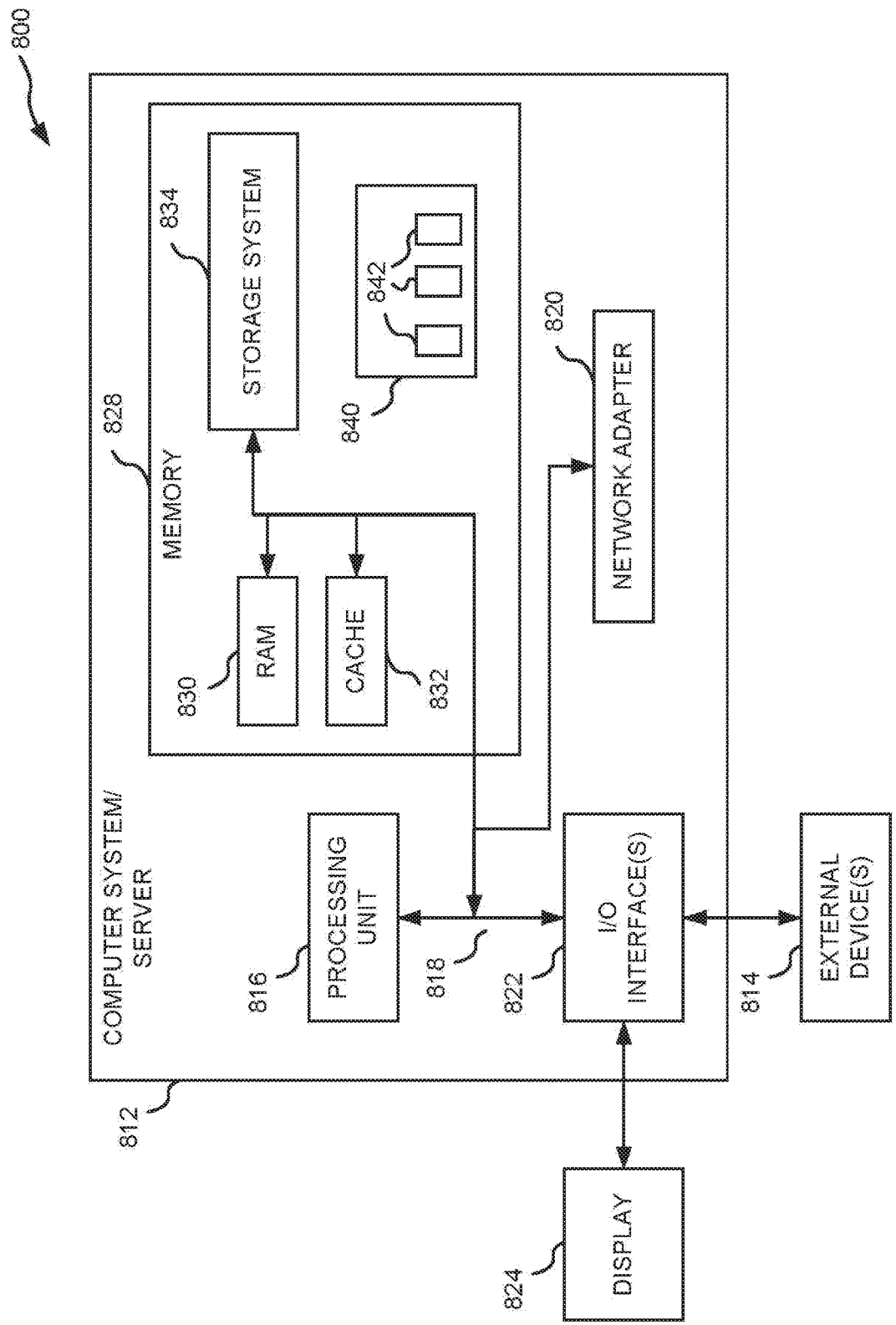
FIG. 8 depicts a computer system in accordance with an exemplary embodiment.

In an exemplary embodiment, the computer system is a standalone computer system, such as computer system 800 shown in FIG. 8, a network of distributed computers, where at least some of the computers are computer systems such as computer system 800 shown in FIG. 8, or a cloud computing node server, such as computer system 800 shown in FIG. 8. In an embodiment, the computer system is a computer system 800 as shown in FIG. 8, that executes an analyzing data collected by analytical instruments script or computer software application that carries out the operations of at least method 100. In an embodiment, the computer system is a computer system/server 812 as shown in FIG. 8, that executes an analyzing data collected by analytical instruments script or computer software application that carries out the operations of at least method 100. In an embodiment, the computer system is a processing unit 816 as shown in FIG. 8, that executes an analyzing data collected by analytical instruments script or computer software application that carries out the operations of at least method 100. In an embodiment, the computer system is a processor of the analytical instrument, that executes an analyzing data collected by analytical instruments script or computer software application that carries out the operations of at least method 100.

In an embodiment, the computer system is a computer system 800 as shown in FIG. 8, that executes an analyzing data collected by analytical instruments script or computer software application that carries out at least operations 110, 112, 114, 116, 118, and 120. In an embodiment, the computer system is a computer system/server 812 as shown in FIG. 8, that executes an in analyzing data collected by analytical instruments script or computer software application that carries out at least operations 110, 112, 114, 116, 118, and 120. In an embodiment, the computer system is a processing unit 816 as shown in FIG. 8, that executes an analyzing data collected by analytical instruments script or computer software application that carries out at least operations 110, 112, 114, 116, 118, and 120. In an embodiment, the computer system is a processor of the analytical instrument, that executes an analyzing data collected by analytical instruments script or computer software application that carries out at least operations 110, 112, 114, 116, 118, and 120.

Figure 1B:
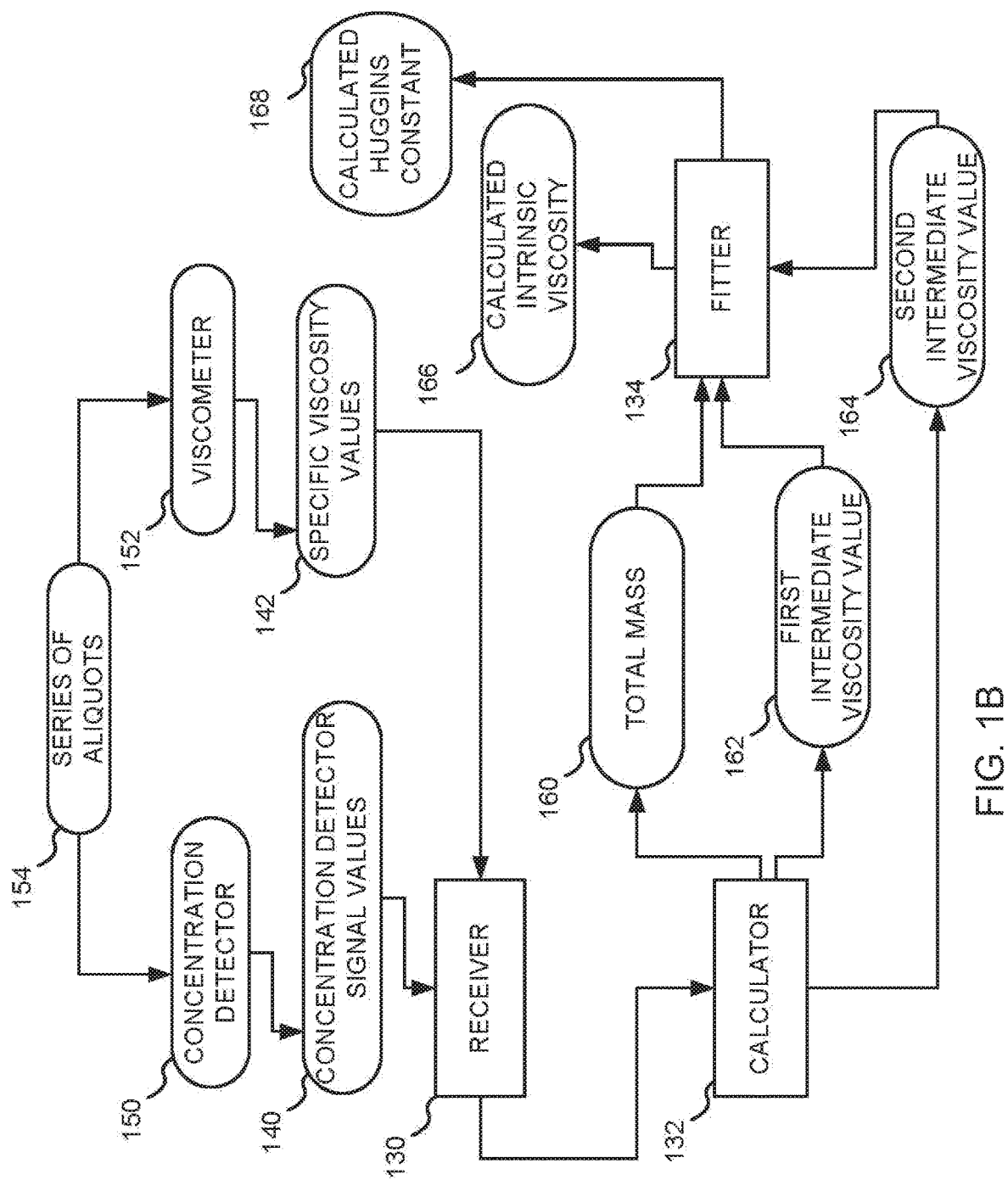
FIG. 1B depicts a block diagram in accordance with an exemplary embodiment.

Referring to FIG. 1B, in an exemplary embodiment, the computer implemented method, the system, and the computer program product include a receiver 130, a calculator 132, and a fitter 134. In an embodiment, receiver 130 is configured to receive concentration detector signal values over time 140, $c_{meas}(t)$, from a concentration detector 150, where concentration detector signal values 140 correspond to concentration values of a series of aliquots 154 of an unknown sample injected into an instrument chain, where the instrument chain includes concentration detector 150. In an embodiment, receiver 130 includes a computer system, such as computer system 800 as shown in FIG. 8, performing operation 110. In an embodiment, receiver 130 includes a computer system, such as computer system/server 812 as shown in FIG. 8, performing operation 110. In an embodiment, receiver 130 includes a computer system, such as processing unit 816 as shown in FIG. 8, performing operation 110. In an embodiment, receiver 130 is implemented as computer software executing on a computer system, such as computer system 800 as shown in FIG. 8, such that the computer system performs operation 110. In an embodiment, receiver 130 is implemented as computer software executing on a computer system, such as computer system/server 812 as shown in FIG. 8, such that the computer system performs operation 110. In an embodiment, receiver 130 is implemented as computer software executing on a computer system, such as processing unit 816 as shown in FIG. 8, such that the computer system performs operation 110. In an embodiment, receiver 130 performs operation 110 as computer software executing on a processor of receiver 130.

In an embodiment, receiver 130 is configured to receive specific viscosity values over time 142, $\eta_{sp}(t)$, from a viscometer 152, where specific viscosity values 142 correspond to series of aliquots 154, where the instrument chain further includes viscometer 152. In an embodiment, receiver 130 includes a computer system, such as computer system 800 as shown in FIG. 8, performing operation 112. In an embodiment, receiver 130 includes a computer system, such as computer system/server 812 as shown in FIG. 8, performing operation 112. In an embodiment, receiver 130 includes a computer system, such as processing unit 816 as shown in FIG. 8, performing operation 112. In an embodiment, receiver 130 is implemented as computer software executing on a computer system, such as computer system 800 as shown in FIG. 8, such that the computer system performs operation 112. In an embodiment, receiver 130 is implemented as computer software executing on a computer system, such as computer system/server 812 as shown in FIG. 8, such that the computer system performs operation 112. In an embodiment, receiver 130 is implemented as computer software executing on a computer system, such as processing unit 816 as shown in FIG. 8, such that the computer system performs operation 112. In an embodiment, receiver 130 performs operation 112 as computer software executing on a processor of receiver 130.

In an embodiment, calculator 132 is configured to execute a set of logical operations calculating a total mass of each of the aliquots 160, $m_i$, as a first integral function of received concentration detector signal values 140, $c_{meas}(t)$, corresponding to the each of the aliquots. In an embodiment, calculator 132 includes a computer system, such as computer system 800 as shown in FIG. 8, performing operation 114. In an embodiment, calculator 132 includes a computer system, such as computer system/server 812 as shown in FIG. 8, performing operation 114. In an embodiment, calculator 132 includes a computer system, such as processing unit 816 as shown in FIG. 8, performing operation 114. In an embodiment, calculator 132 is implemented as computer software executing on a computer system, such as computer system 800 as shown in FIG. 8, such that the computer system performs operation 114. In an embodiment, calculator 132 is implemented as computer software executing on a computer system, such as computer system/server 812 as shown in FIG. 8, such that the computer system performs operation 114. In an embodiment, calculator 132 is implemented as computer software executing on a computer system, such as processing unit 816 as shown in FIG. 8, such that the computer system performs operation 114. In an embodiment, calculator 132 performs operation 114 as computer software executing on a processor of calculator 132.

In an embodiment, calculator 132 is configured to execute a set of logical operations calculating a first intermediate viscosity value of the each of the aliquots 162, $I\eta_i$, as a second integral function of received specific viscosity values 142, $\eta_{sp}(t)$, corresponding to the each of the aliquots. In an embodiment, calculator 132 includes a computer system, such as computer system 800 as shown in FIG. 8, performing operation 116. In an embodiment, calculator 132 includes a computer system, such as computer system/server 812 as shown in FIG. 8, performing operation 116. In an embodiment, calculator 132 includes a computer system, such as processing unit 816 as shown in FIG. 8, performing operation 116. In an embodiment, calculator 132 is implemented as computer software executing on a computer system, such as computer system 800 as shown in FIG. 8, such that the computer system performs operation 116. In an embodiment, calculator 132 is implemented as computer software executing on a computer system, such as computer system/server 812 as shown in FIG. 8, such that the computer system performs operation 116. In an embodiment, calculator 132 is implemented as computer software executing on a computer system, such as processing unit 816 as shown in FIG. 8, such that the computer system performs operation 116. In an embodiment, calculator 132 performs operation 116 as computer software executing on a processor of calculator 132.

In an embodiment, calculator 132 is configured to execute a set of logical operations calculating a second intermediate viscosity value of the each of the aliquots 164, $I2\eta_i$, as a third integral function of received specific viscosity values 142, $\eta_{sp}(t)$, corresponding to the each of the aliquots. In an embodiment, calculator 132 includes a computer system, such as computer system 800 as shown in FIG. 8, performing operation 118. In an embodiment, calculator 132 includes a computer system, such as computer system/server 812 as shown in FIG. 8, performing operation 118. In an embodiment, calculator 132 includes a computer system, such as processing unit 816 as shown in FIG. 8, performing operation 118. In an embodiment, calculator 132 is implemented as computer software executing on a computer system, such as computer system 800 as shown in FIG. 8, such that the computer system performs operation 118. In an embodiment, calculator 132 is implemented as computer software executing on a computer system, such as computer system/server 812 as shown in FIG. 8, such that the computer system performs operation 118. In an embodiment, calculator 132 is implemented as computer software executing on a computer system, such as processing unit 816 as shown in FIG. 8, such that the computer system performs operation 118. In an embodiment, calculator 132 performs operation 118 as computer software executing on a processor of calculator 132.

In an embodiment, fitter 134 is configured to execute a set of logical operations fitting total mass of the each of the aliquots 160, $m_i$, first intermediate viscosity value of the each of the aliquots 162, $I\eta_i$, and second intermediate viscosity value of the each of the aliquots 164, $I2\eta_i$, to a fitting function comprising the first integral function, a floating intrinsic viscosity of the unknown sample, $[\eta]$, the second integral function, a floating Huggins constant of the unknown sample, $K_h$, and the third integral function, resulting in a calculated intrinsic viscosity of the unknown sample 166 and a calculated Huggins constant of the unknown sample 168. In an embodiment, fitter 134 includes a computer system, such as computer system 800 as shown in FIG. 8, performing operation 120. In an embodiment, fitter 134 a computer system, such as computer system/server 812 as shown in FIG. 8, performing operation 120. In an embodiment, fitter 134 includes a computer system, such as processing unit 816 as shown in FIG. 8, performing operation 120. In an embodiment, fitter 134 is implemented as computer software executing on a computer system, such as computer system 800 as shown in FIG. 8, such that the computer system performs operation 120. In an embodiment, fitter 134 is implemented as computer software executing on a computer system, such as computer system/server 812 as shown in FIG. 8, such that the computer system performs operation 120. In an embodiment, fitter 134 is implemented as computer software executing on a computer system, such as processing unit 816 as shown in FIG. 8, such that the computer system performs operation 120. In an embodiment, fitter 134 performs operation 120 as computer software executing on a processor of fitter 134.

Calculating Total Mass

In an exemplary embodiment, the first integral function is $$m_i = \int_{peak_i} c_{meas}(t)dt.$$

Calculating First Intermediate Viscosity Value

In an exemplary embodiment, the second integral function is $$I\eta_i = \int_{peak_i} \eta_{sp}(t)dt.$$

Calculating Second Intermediate Viscosity Value

In an exemplary embodiment, the third integral function is $$I2\eta_i = \int_{peak_i} \eta_{sp}^2(t)dt.$$

Fitting Total Mass, First Intermediate Viscosity Value, and Second Intermediate Viscosity Value to Fitting Function In an exemplary embodiment, the fitting comprises a least squares fitting. In an embodiment, the least squares fitting comprises a non-linear least squares fitting. In an embodiment, the fitting function is $$m_i = \frac{1}{[\eta]} I\eta_i - \frac{K_h}{[\eta]} I2\eta_i.$$

Calculating Figure of Merit (FOM)

In a further embodiment, the computer implemented method, the system, and the computer program product further include executing, by the computer system, a set of logical operations calculating a figure of merit, FOM, characterizing a contribution of $K_h$ to fitting, as a ratio function of $K_h$, the second intermediate viscosity value of the each of the aliquots, $I2\eta_i$, and the first intermediate viscosity value of the each of the aliquots, $I\eta_i$. In a further embodiment, the computer implemented method, the system, and the computer program product are further configured to perform an operation of executing, by the computer system, a set of logical operations calculating a figure of merit, FOM, characterizing a contribution of $K_h$ to fitting, as a ratio function of $K_h$, the second intermediate viscosity value 164 of the each of the aliquots, $I2\eta_i$, and the first intermediate viscosity value 162 of the each of the aliquots, $I\eta_i$.

In an exemplary embodiment, the ratio function is $$FOM=(K_h I2\eta_i)/I\eta_i.$$

The figure of merit, FOM, is a dimensionless number that could characterize the Huggins constant, $K_h$, contribution to the data/fitting. If the FOM were to be too small, then the $K_h$ contribution to the data/fitting would be small, resulting in an inaccurate calculated Huggins constant, $K_h$, as indicated by a high standard error in the calculated Huggins constant, Kh, value. If $K_h$ were $>=1$, then approximations used to derive the fitting function would not be valid, also resulting in an inaccurate calculated Huggins constant, $K_h$. If the FOM were between 0.05 and 0.5, then the calculated Huggins constant, $K_h$, could be reliable.

In an embodiment, the computer system includes a computer system, such as computer system 800 as shown in FIG. 8, executing a set of logical operations calculating a figure of merit, FOM, characterizing a contribution of $K_h$ to fitting, as a ratio function of $K_h$, the second intermediate viscosity value 164 of the each of the aliquots, $I2\eta_i$, and the first intermediate viscosity value 162 of the each of the aliquots, $I\eta_i$. In an embodiment, the computer system includes a computer system, such as computer system/server 812 as shown in FIG. 8, executing a set of logical operations calculating a figure of merit, FOM, characterizing a contribution of $K_h$ to fitting, as a ratio function of $K_h$, the second intermediate viscosity value 164 of the each of the aliquots, $I2\eta_i$, and the first intermediate viscosity value 162 of the each of the aliquots, $I\eta_i$. In an embodiment, the computer system includes a computer system, such as processing unit 816 as shown in FIG. 8, executing a set of logical operations calculating a figure of merit, FOM, characterizing a contribution of $K_h$ to fitting, as a ratio function of $K_h$, the second intermediate viscosity value 164 of the each of the aliquots, $I2\eta_i$, and the first intermediate viscosity value 162 of the each of the aliquots, $I\eta_i$.

In an embodiment, the computer system is implemented as computer software executing on a computer system, such as computer system 800 as shown in FIG. 8, such that the computer system executes a set of logical operations calculating a figure of merit, FOM, characterizing a contribution of $K_h$ to fitting, as a ratio function of $K_h$, the second intermediate viscosity value 164 of the each of the aliquots, $I2\eta_i$, and the first intermediate viscosity value 162 of the each of the aliquots, $I\eta_i$. In an embodiment, the computer system is implemented as computer software executing on a computer system, such as computer system/server 812 as shown in FIG. 8, such that the computer system executes a set of logical operations calculating a figure of merit, FOM, characterizing a contribution of $K_h$ to fitting, as a ratio function of $K_h$, the second intermediate viscosity value 164 of the each of the aliquots, $I2\eta_i$, and the first intermediate viscosity value 162 of the each of the aliquots, $I\eta_i$. In an embodiment, the computer system is implemented as computer software executing on a computer system, such as processing unit 816 as shown in FIG. 8, such that the computer system executes a set of logical operations calculating a figure of merit, FOM, characterizing a contribution of $K_h$ to fitting, as a ratio function of $K_h$, the second intermediate viscosity value 164 of the each of the aliquots, $I2\eta_i$, and the first intermediate viscosity value 162 of the each of the aliquots, $I\eta_i$.

In an embodiment, the computer system executes a set of logical operations calculating a figure of merit, FOM, characterizing a contribution of $K_h$ to fitting, as a ratio function of $K_h$, the second intermediate viscosity value 164 of the each of the aliquots, $I2\eta_i$, and the first intermediate viscosity value 162 of the each of the aliquots, $I\eta_i$, as computer software executing on a processor of the computer system.

Displaying Results

In a further embodiment, the computer implemented method, the system, and the computer program product further include (a) executing, by the computer system, a set of logical operations calculating a ratio of the first intermediate viscosity value of the each of the aliquots, $I\eta_i$, to the total mass of the each of the aliquots, $m_i$, and (b) displaying, by the computer system, a plot of the calculated ratio of the each of the aliquots versus the total mass, $m_i$, of the each of the aliquots. In an embodiment, the computer implemented method, the system, and the computer program product generate a plot of intrinsic viscosity versus peak mass by plotting the calculated ratio of the ach of the aliquots versus the total mass, $m_i$, of the each of the aliquots. The plot could allow for a simple linear fit, as opposed to a two-dimensional fit.

Figure 2:
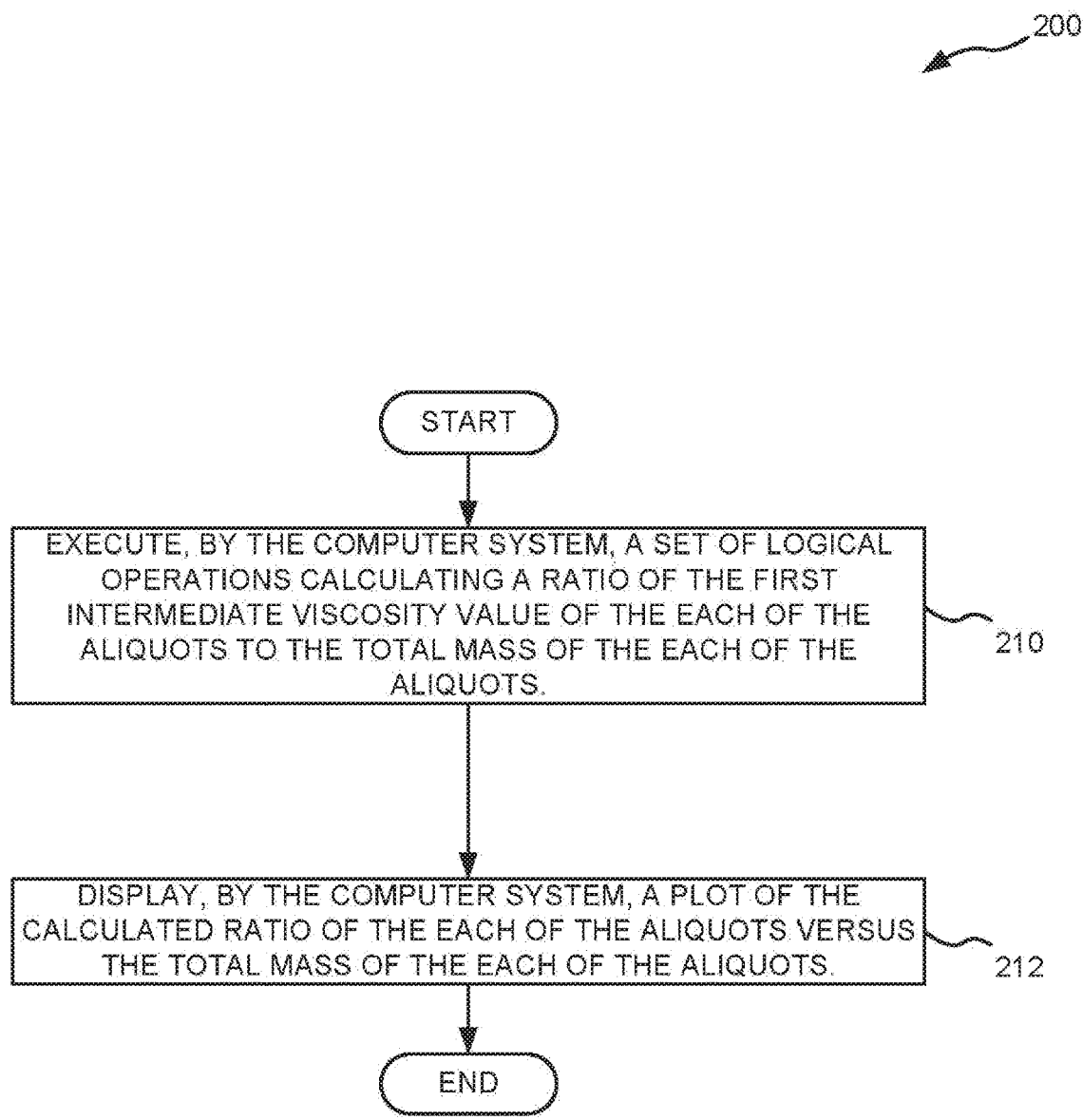
FIG. 2 depicts a flowchart in accordance with an exemplary embodiment.

Referring to FIG. 2, the computer implemented method, the system, and the computer program product are further configured to perform an operation 210 of executing, by the computer system, a set of logical operations calculating a ratio of the first intermediate viscosity value of the each of the aliquots, $I\eta_i$, to the total mass of the each of the aliquots, $m_i$, and an operation 212 of displaying, by the computer system, a plot of the calculated ratio of the each of the aliquots versus the total mass, $m_i$, of the each of the aliquots.

In a further embodiment, the computer implemented method, the system, and the computer program product are further configured to an operation of executing, by the computer system, a set of logical operations calculating a ratio of the first intermediate viscosity value 162 of the each of the aliquots, $I\eta_i$, to the total mass 160 of the each of the aliquots, $m_i$, and an operation of displaying, by the computer system, a plot of the calculated ratio of the each of the aliquots versus the total mass 160, $m_i$, of the each of the aliquots.

In an embodiment, the computer system includes a computer system, such as computer system 800 as shown in FIG. 8, executing a set of logical operations calculating a ratio of the first intermediate viscosity value 162 of the each of the aliquots, $I\eta_i$, to the total mass 160 of the each of the aliquots, $m_i$, and an operation of displaying a plot of the calculated ratio of the each of the aliquots versus the total mass 160, $m_i$, of the each of the aliquots. In an embodiment, the computer system includes a computer system, such as computer system/server 812 as shown in FIG. 8, executing a set of logical operations calculating a ratio of the first intermediate viscosity value 162 of the each of the aliquots, $I\eta_i$, to the total mass 160 of the each of the aliquots, $m_i$, and an operation of displaying a plot of the calculated ratio of the each of the aliquots versus the total mass 160, $m_i$, of the each of the aliquots. In an embodiment, the computer system includes a computer system, such as processing unit 816 as shown in FIG. 8, executing a set of logical operations calculating a ratio of the first intermediate viscosity value 162 of the each of the aliquots, $I\eta_i$, to the total mass 160 of the each of the aliquots, $m_i$, and an operation of displaying a plot of the calculated ratio of the each of the aliquots versus the total mass 160, $m_i$, of the each of the aliquots.

In an embodiment, the computer system is implemented as computer software executing on a computer system, such as computer system 800 as shown in FIG. 8, such that the computer system executes a set of logical operations calculating a ratio of the first intermediate viscosity value 162 of the each of the aliquots, $I\eta_i$, to the total mass 160 of the each of the aliquots, $m_i$, and an operation of displaying a plot of the calculated ratio of the each of the aliquots versus the total mass 160, $m_i$, of the each of the aliquots. In an embodiment, the computer system is implemented as computer software executing on a computer system, such as computer system/server 812 as shown in FIG. 8, such that the computer system executes a set of logical operations calculating a ratio of the first intermediate viscosity value 162 of the each of the aliquots, $I\eta_i$, to the total mass 160 of the each of the aliquots, $m_i$, and an operation of displaying a plot of the calculated ratio of the each of the aliquots versus the total mass 160, $m_i$, of the each of the aliquots. In an embodiment, the computer system is implemented as computer software executing on a computer system, such as processing unit 816 as shown in FIG. 8, such that the computer system executes a set of logical operations calculating a ratio of the first intermediate viscosity value 162 of the each of the aliquots, $I\eta_i$, to the total mass 160 of the each of the aliquots, $m_i$, and an operation of displaying a plot of the calculated ratio of the each of the aliquots versus the total mass 160, $m_i$, of the each of the aliquots.

In an embodiment, the computer system executes a set of logical operations calculating a ratio of the first intermediate viscosity value 162 of the each of the aliquots, $I\eta_i$, to the total mass 160 of the each of the aliquots, $m_i$, and an operation of displaying a plot of the calculated ratio of the each of the aliquots versus the total mass 160, $m_i$, of the each of the aliquots, as computer software executing on a processor of the computer system.

Example

Figure 3:
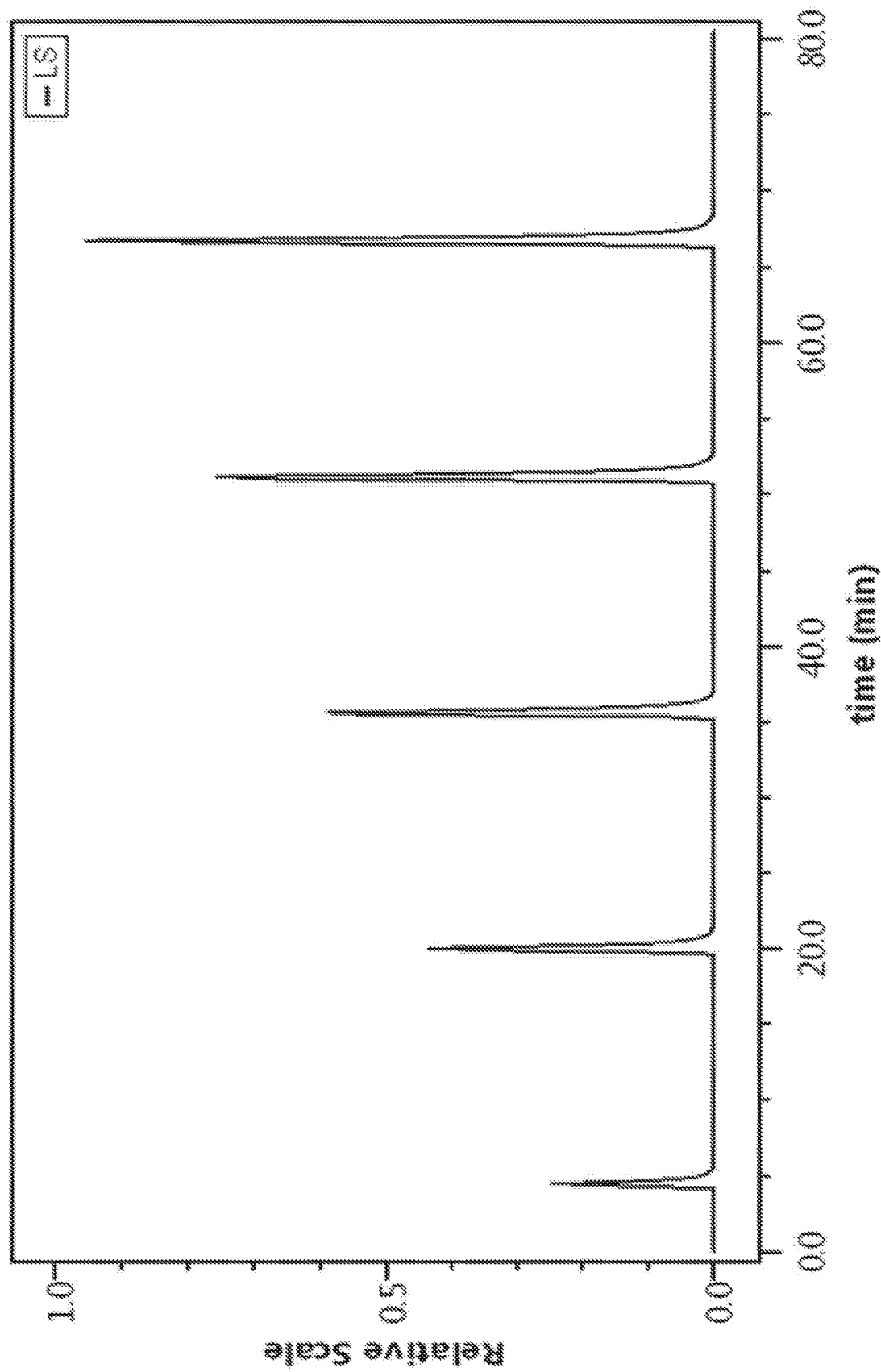
FIG. 3 depicts a graph in accordance with an embodiment.

For example, the computer implemented method, system, and computer product could calculate the intrinsic viscosity and the Huggins constant of a series of aliquots 154 of an unknown sample, where the series of aliquots could be generated by injecting a single concentration of the unknown sample, with varying injection volumes, into the instrument chain, as depicted in FIG. 3. Notably, FIG. 3 depicts a series of injections of varying total mass.

For each injection, calculator 132 could calculate total mass 160, $m_i$, in the injection, first intermediate viscosity value 162, $I\eta_i$, and second intermediate viscosity value 164, $I2\eta_i$, resulting in triples of total mass 160, first intermediate viscosity value 162, and second intermediate viscosity value 164 (mi, $I\eta_i$, $I2\eta_i$), over the injections of the unknown sample. Thereafter, fitter 134 fits the triples to the fitting function, resulting in calculated intrinsic viscosity 166 and calculated Huggins constant 168 of the unknown sample.

Figure 4A:
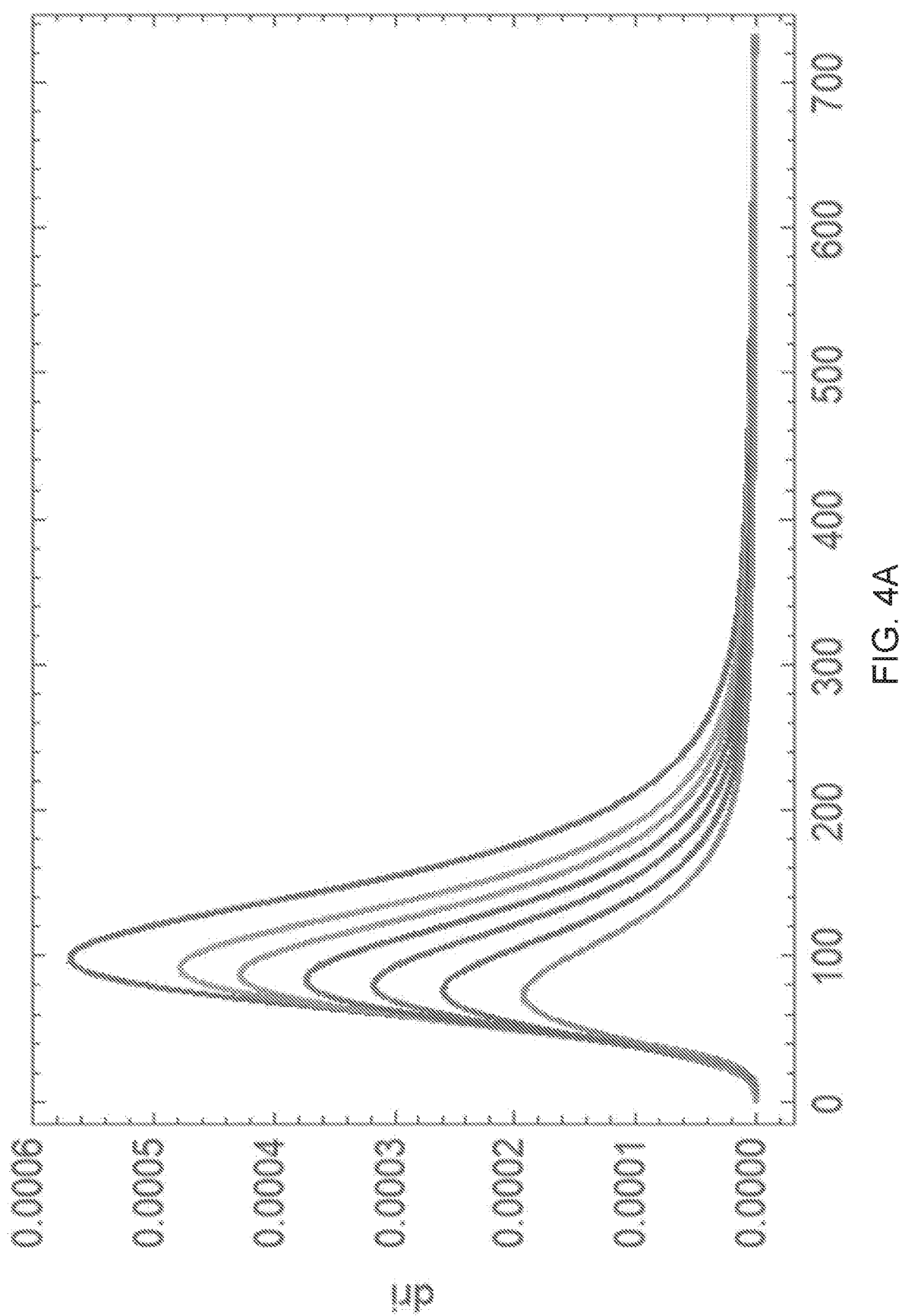
FIG. 4A depicts a graph in accordance with an embodiment.
Figure 4B:
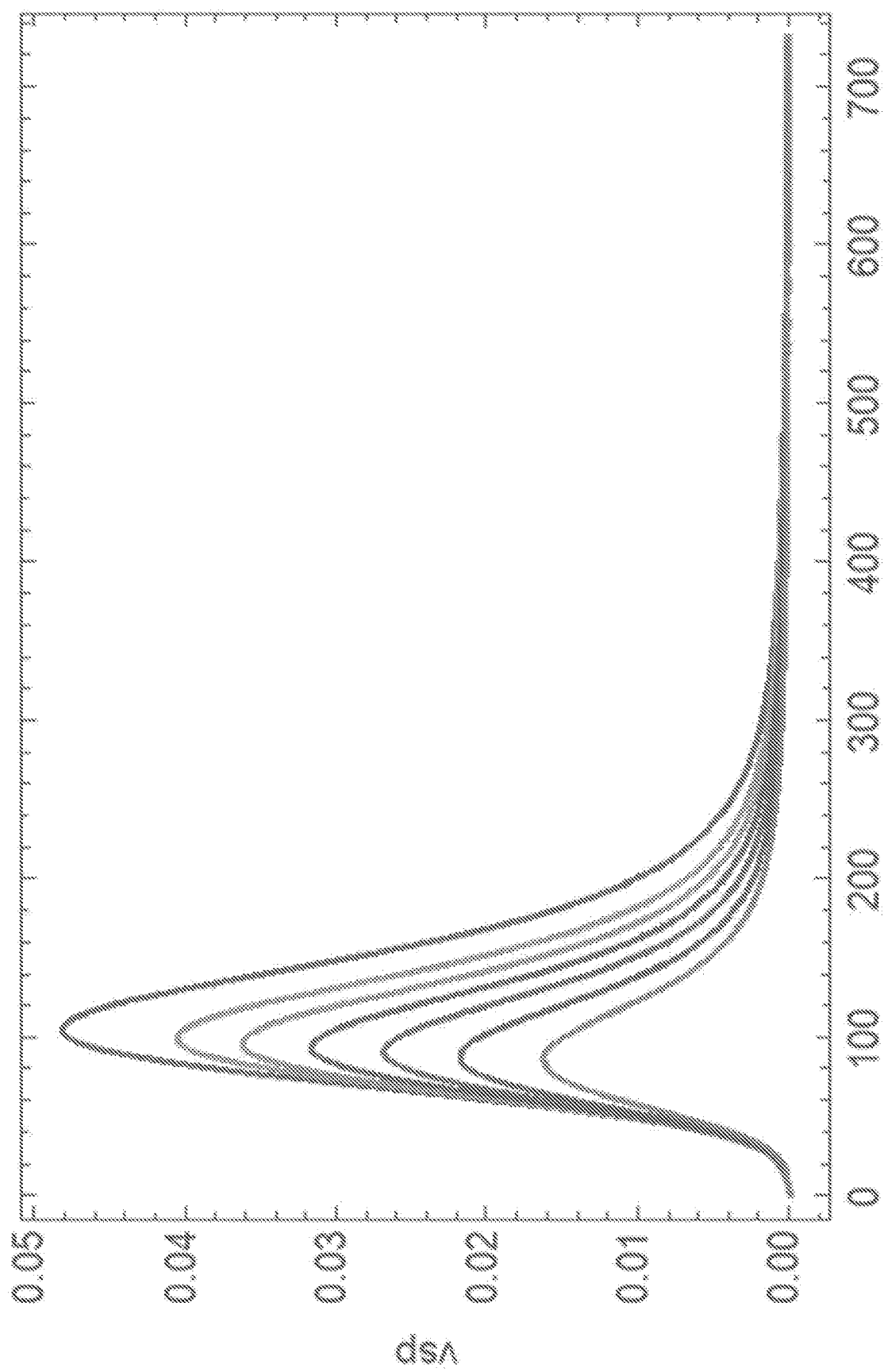
FIG. 4B depicts a graph in accordance with an embodiment.
Figure 4C:
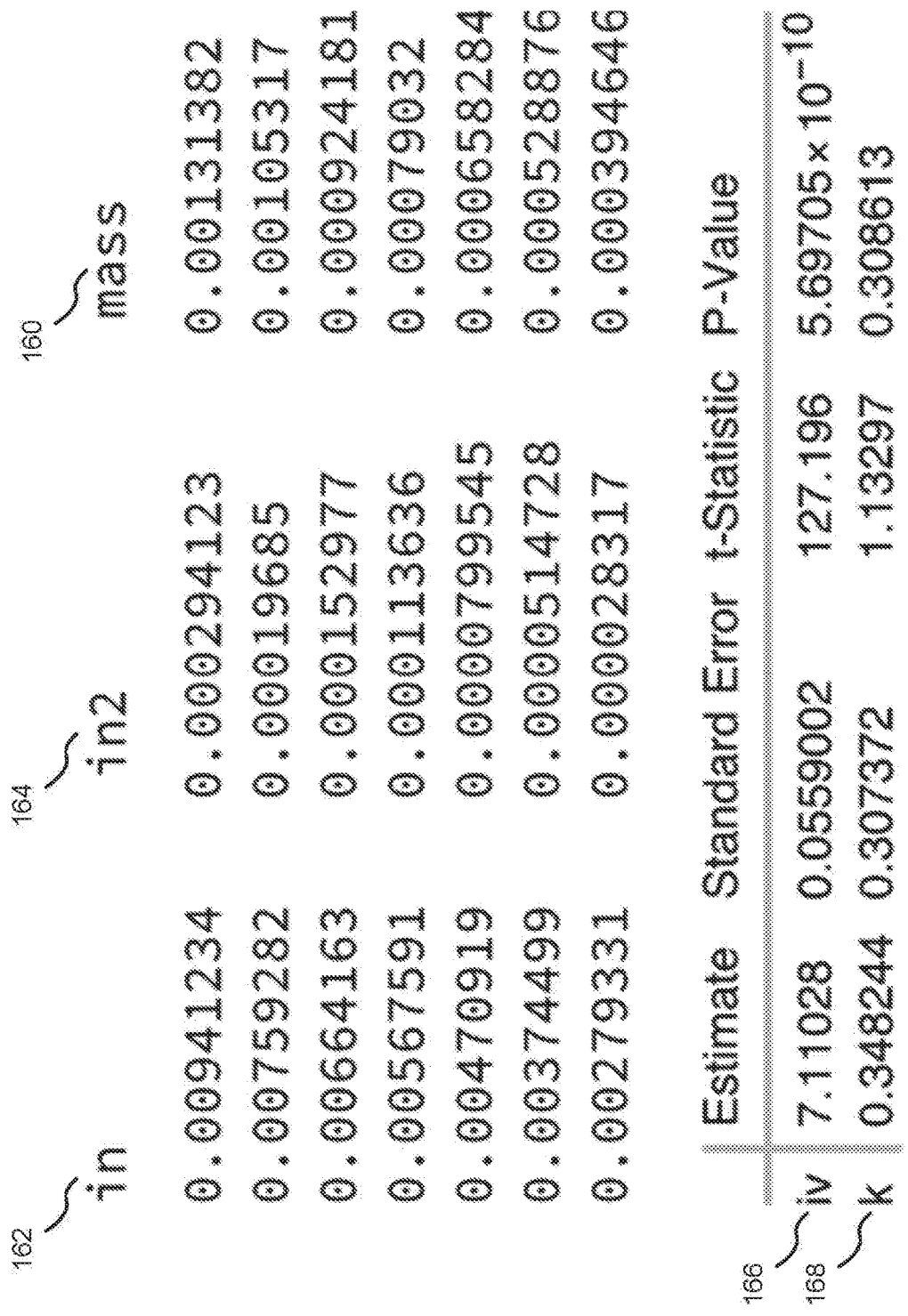
FIG. 4C depicts data in accordance with an embodiment.

For example, FIG. 4A depicts measured/received concentration detector signal values 140 (dRI) of a first set of seven injections of a first unknown sample (a protein) having a first concentration range, FIG. 4B depicts measured/received specific viscosity values 142 of the first set of seven injections, and FIG. 4C describe the calculated triples (mi, $I\eta_i$, $I2\eta_i$) of the first set of seven injections calculated by calculator 132, calculated intrinsic viscosity 166 and calculated Huggins constant 168 of the first unknown sample as generated by fitter 134, and a FOM, of the first unknown sample, based on the first set of seven injections.

Figure 5A:
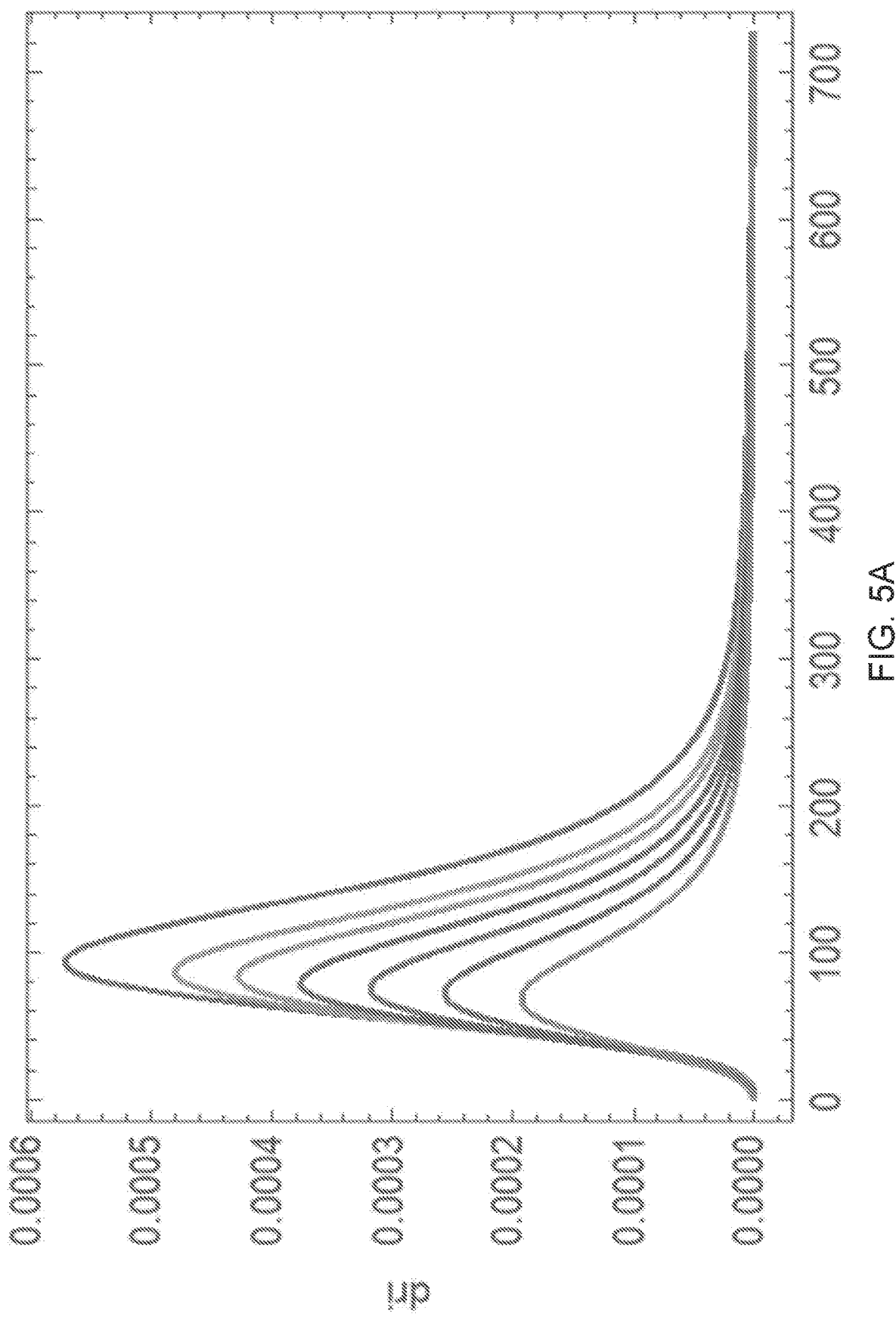
FIG. 5A depicts a graph in accordance with an embodiment.
Figure 5B:
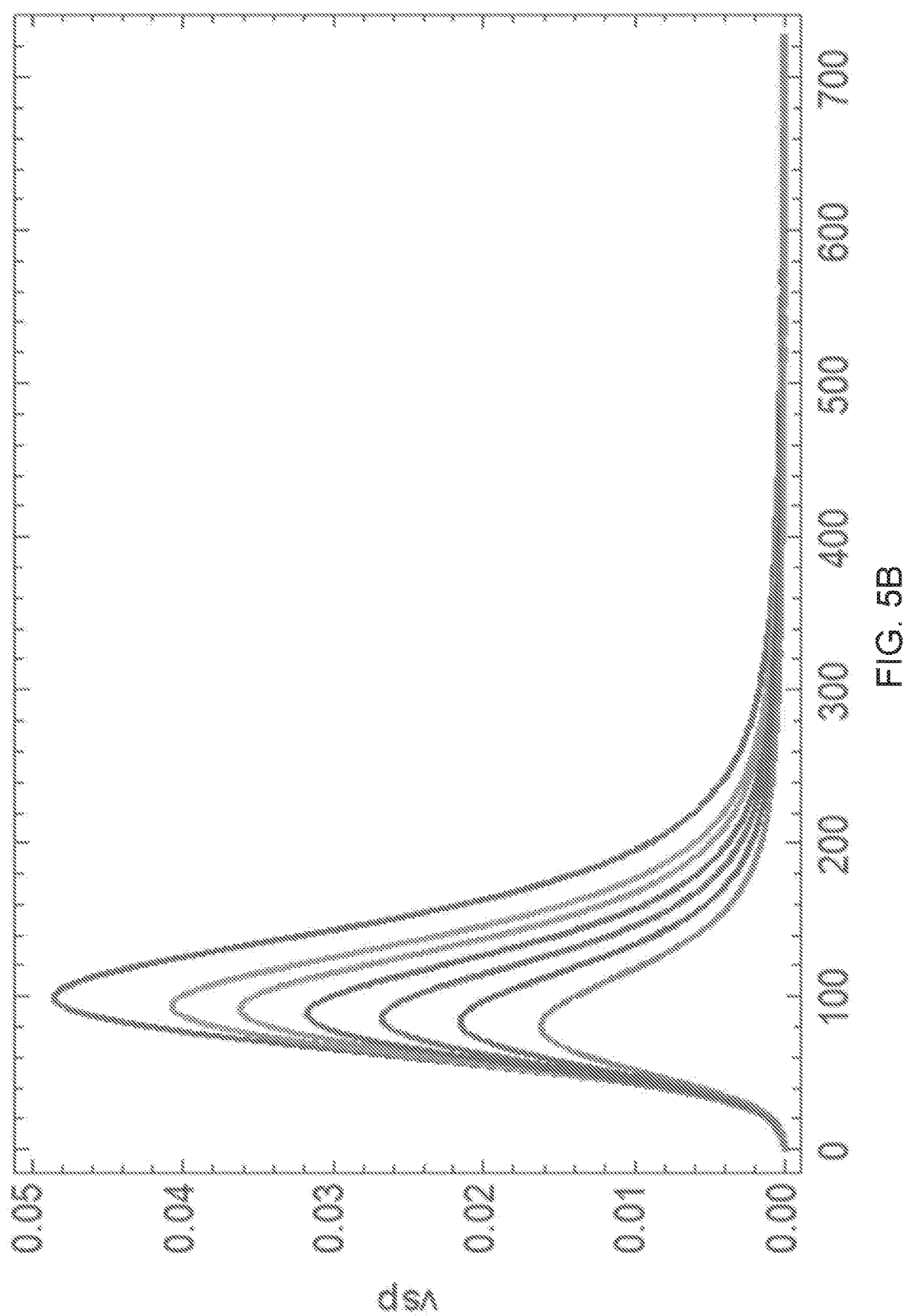
FIG. 5B depicts a graph in accordance with an embodiment.
Figure 5C:
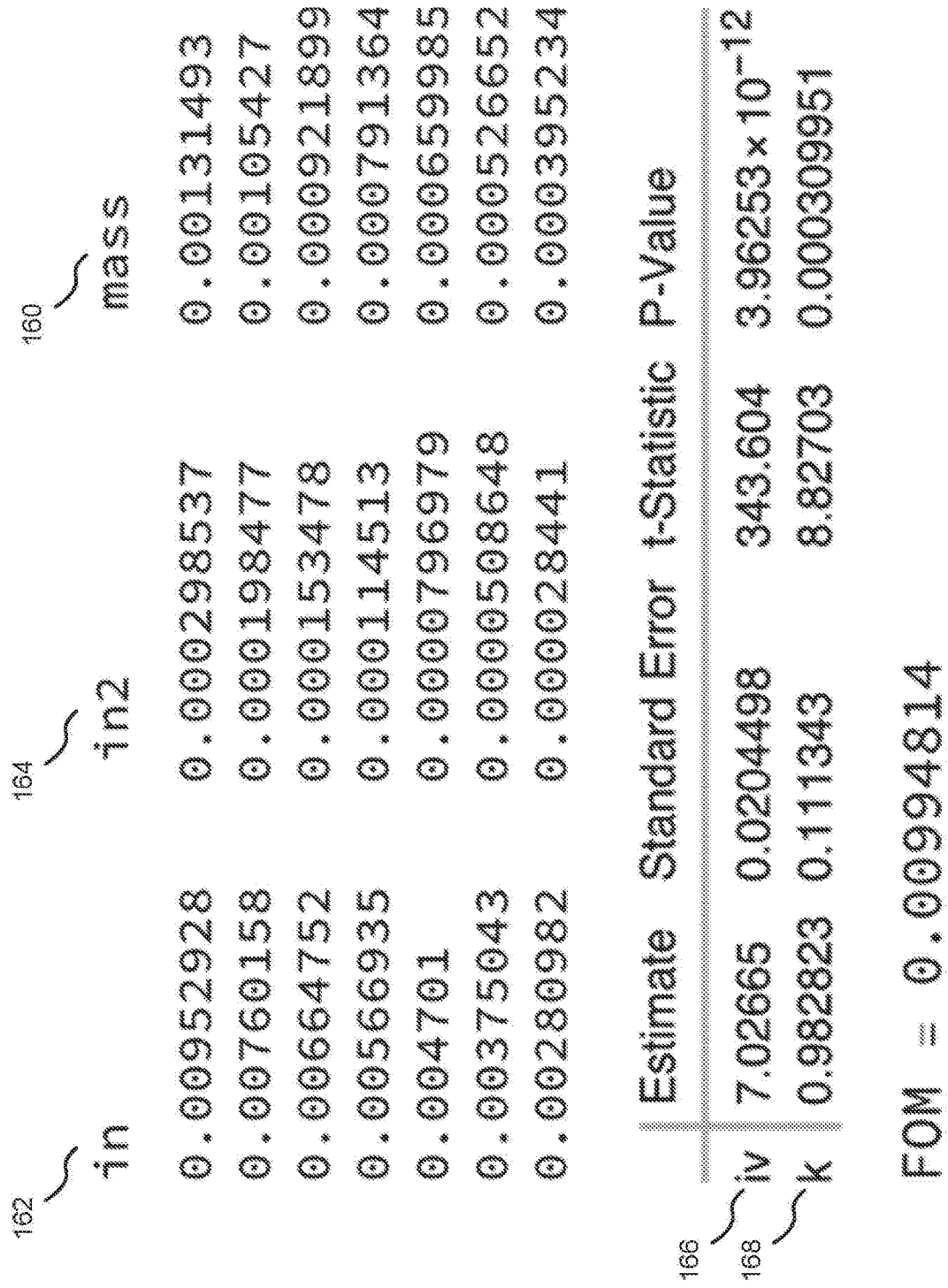
FIG. 5C depicts data in accordance with an embodiment.

For example, FIG. 5A depicts measured/received concentration detector signal values 140 (dRI) of a second set of seven injections of the first unknown sample (a protein) having a second concentration range, FIG. 5B depicts measured/received specific viscosity values 142 of the second set of seven injections, and FIG. 5C describe the calculated triples (mi, $I\eta_i$, $I2\eta_i$) of the second set of seven injections calculated by calculator 132, calculated intrinsic viscosity 166 and calculated Huggins constant 168 of the first unknown sample as generated by fitter 134, and a FOM, of the first unknown sample, based on the second set of seven injections.

Figure 6A:
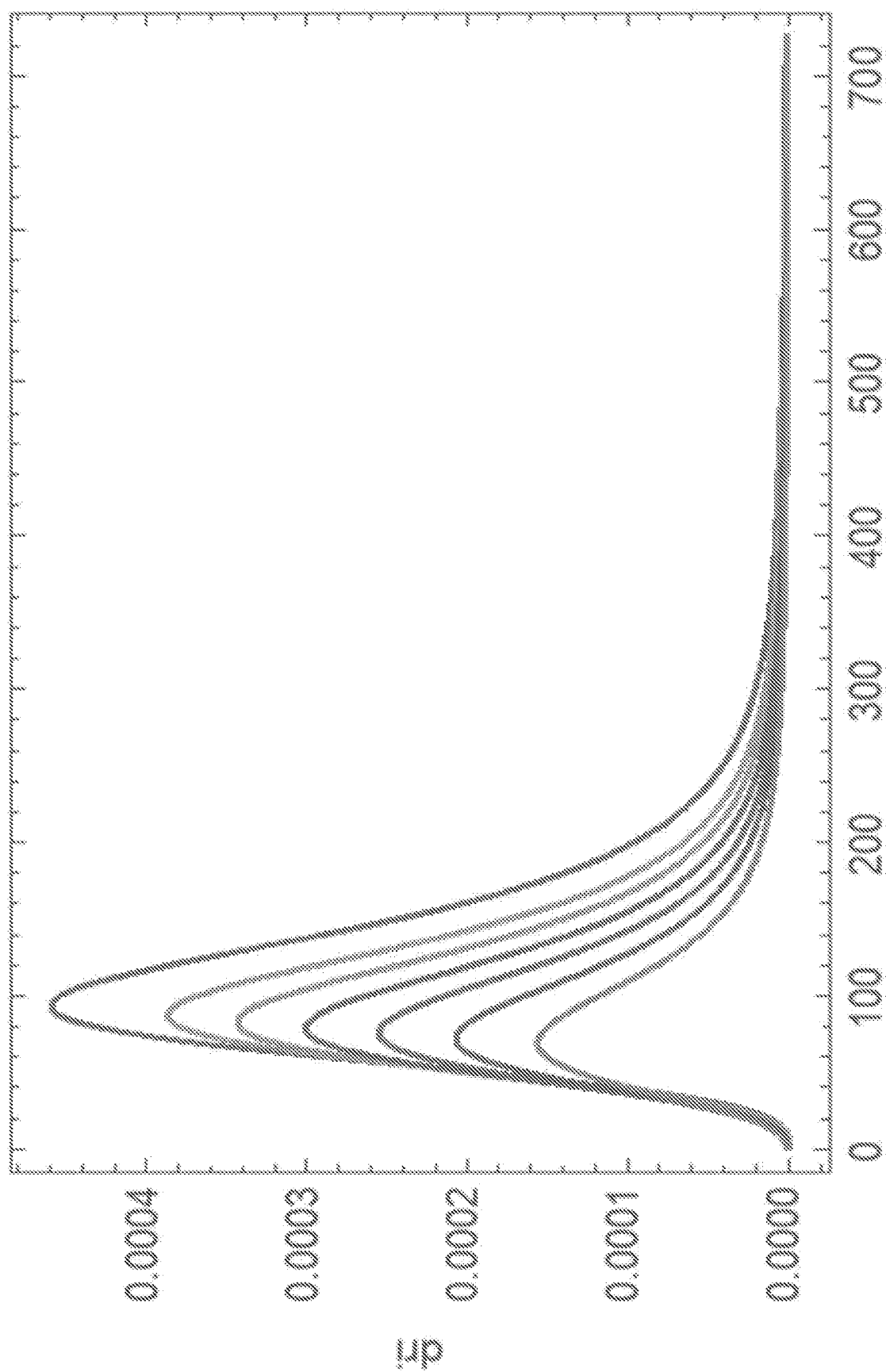
FIG. 6A depicts a graph in accordance with an embodiment.
Figure 6B:
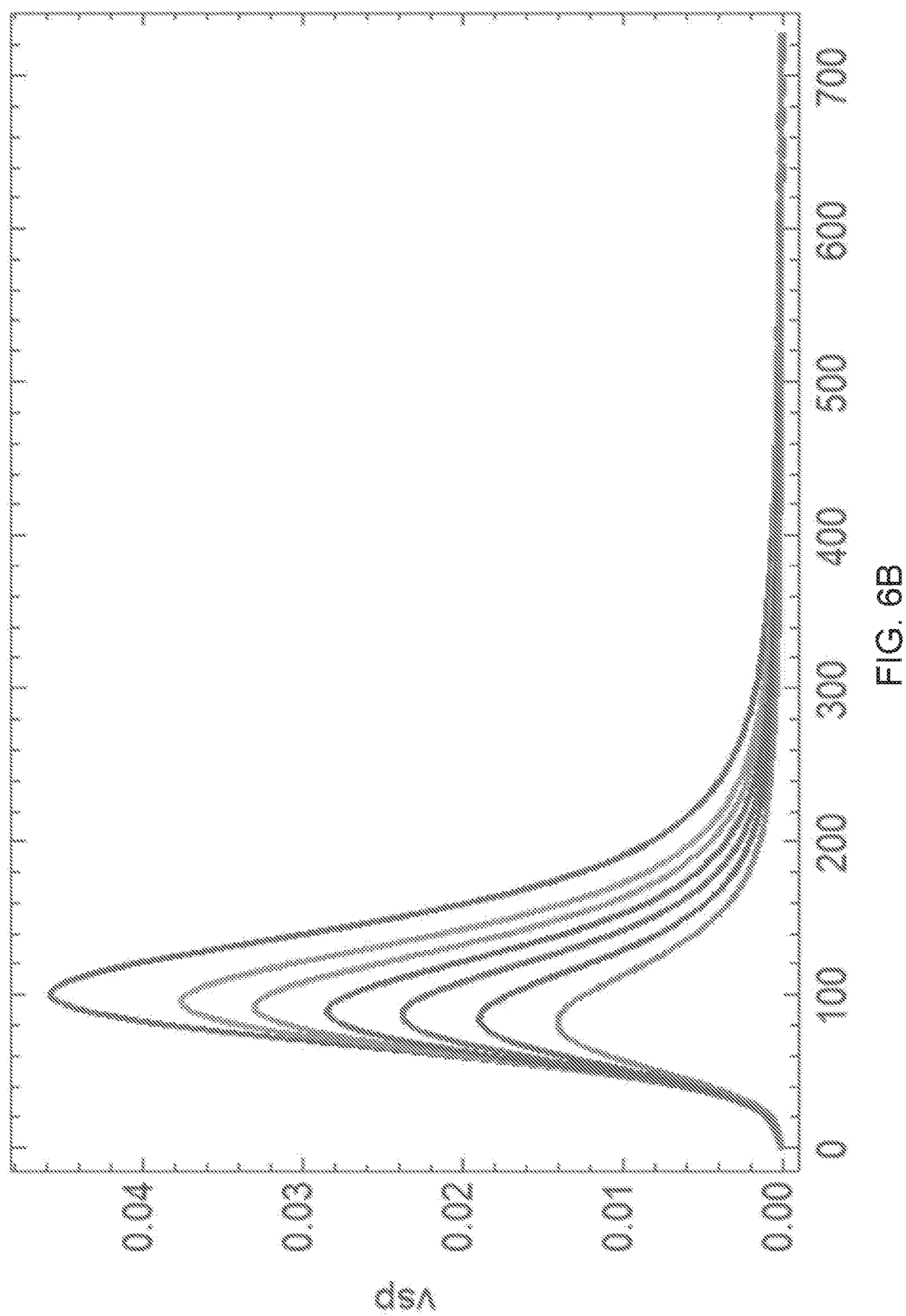
FIG. 6B depicts a graph in accordance with an embodiment.

For example, FIG. 6A depicts measured/received concentration detector signal values 140 (dRI) of a set of seven injections of a second unknown sample (a protein), FIG. 6B depicts measured/received specific viscosity values 142 of the set of seven injections of the second unknown sample, and FIG. 6C describe the calculated triples (mi, $I\eta_i$, $I2\eta_i$) of the set of seven injections of the second unknown sample calculated by calculator 132, calculated intrinsic viscosity 166 and calculated Huggins constant 168 of the second unknown sample as generated by fitter 134, and a FOM, of the second unknown sample.

Figure 7:
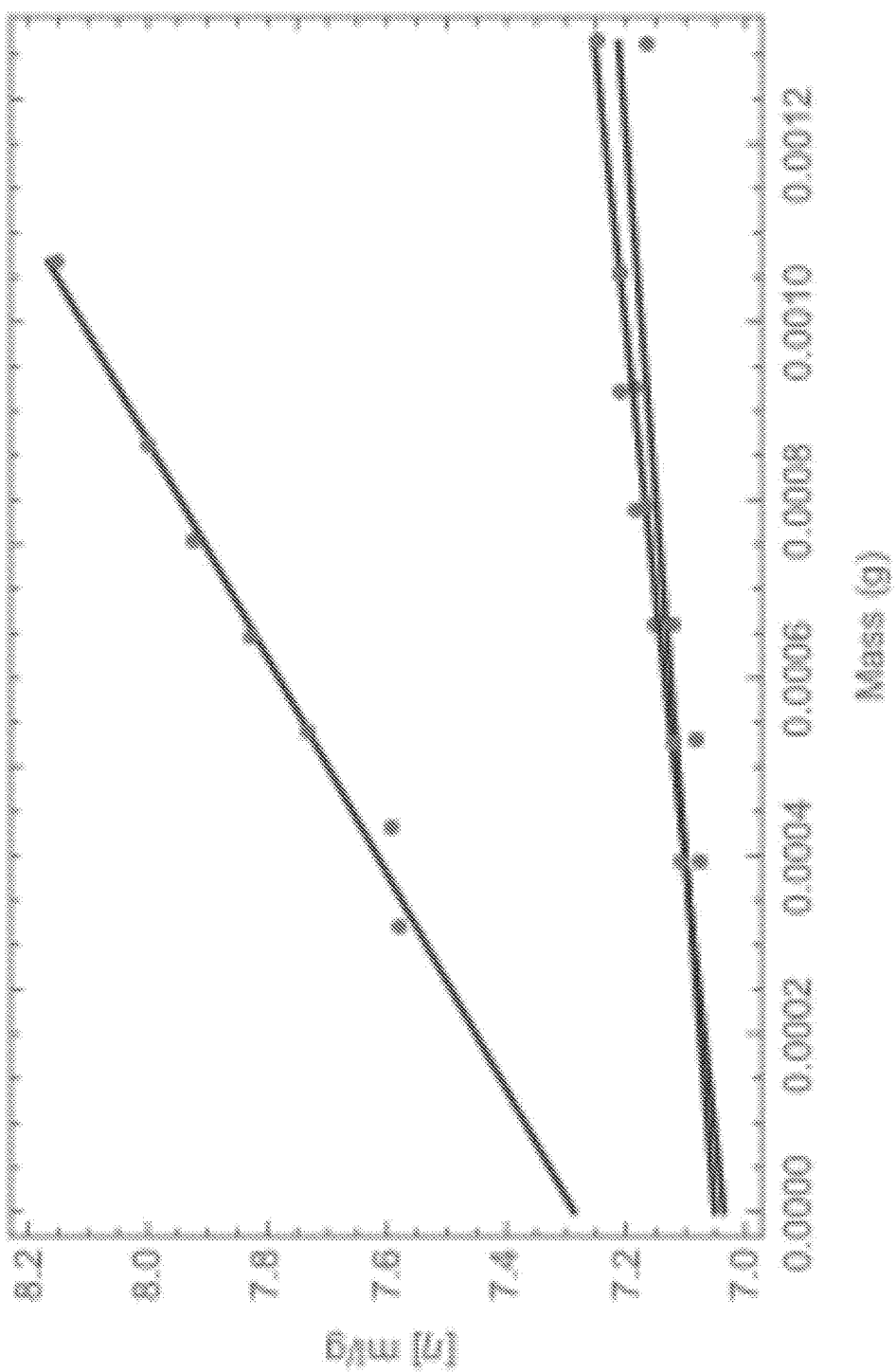
FIG. 7 depicts a graph in accordance with an embodiment.

FIG. 7 depicts, for unknown sample, plots of the calculated ratio of each of the seven aliquots/injections versus total mass 160, $m_i$, of the each of the seven aliquots/injections, as displayed by the computer implemented method, the system, and the computer program product. Notably, FIG. 7 depicts three plots consisting of two intersecting plots corresponding to the first unknown sample and a third plot corresponding to the second unknown sample. The two intersecting plots in FIG. 7 indicate that the results of the computer implemented method, the system, and the computer program product could be reproducible.

Computer System

In an exemplary embodiment, the computer system is a computer system 800 as shown in FIG. 8. Computer system 800 is only one example of a computer system and is not intended to suggest any limitation as to the scope of use or functionality of embodiments of the present invention. Regardless, computer system 800 is capable of being implemented to perform and/or performing any of the functionality/operations of the present invention.

Computer system 800 includes a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 812 may be described in the general context of computer system-executable instructions, such as program modules, being executed by a computer system. Generally, program modules may include routines, programs, objects, components, logic, and/or data structures that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computer system 800 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions/operations of embodiments of the invention.

Program/utility 840, having a set (at least one) of program modules 842, may be stored in memory 828 by way of example, and not limitation. Exemplary program modules 842 may include an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the present invention.

Computer system/server 812 may also communicate with one or more external devices 814 such as a keyboard, a pointing device, a display 824, one or more devices that enable a user to interact with computer system/server 812, and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
receiving, by a computer system, concentration detector signal values over time, $c_{meas}(t)$, from a concentration detector,
    wherein the concentration detector signal values correspond to concentration values of a series of aliquots of an unknown sample injected into an instrument chain,
    wherein the instrument chain comprises the concentration detector;
receiving, by the computer system, specific viscosity values over time, $\eta_{sp}(t)$, from a viscometer,
    wherein the specific viscosity values correspond to the series of aliquots,
    wherein the instrument chain further comprises the viscometer;
executing, by the computer system, a set of logical operations calculating a total mass of each of the aliquots, $m_i$, as a first integral function of the received concentration detector signal values, $c_{meas}(t)$, corresponding to the each of the aliquots;
executing, by the computer system, a set of logical operations calculating a first intermediate viscosity value of the each of the aliquots, $I\eta_i$, as a second integral function of the received specific viscosity values, $\eta_{sp}(t)$, corresponding to the each of the aliquots;
executing, by the computer system, a set of logical operations calculating a second intermediate viscosity value of the each of the aliquots, $I2\eta_i$, as a third integral function of the received specific viscosity values, $\eta_{sp}(t)$, corresponding to the each of the aliquots; and
executing, by the computer system, a set of logical operations fitting the total mass of the each of the aliquots, $m_i$, the first intermediate viscosity value of the each of the aliquots, $I\eta_i$, and the second intermediate viscosity value of the each of the aliquots, $I2\eta_i$, to a fitting function comprising the first integral function, a floating intrinsic viscosity of the unknown sample, [η], the second integral function, a floating Huggins constant of the unknown sample, $K_h$, and the third integral function, resulting in a calculated intrinsic viscosity of the unknown sample and a calculated Huggins constant of the unknown sample.

2. The method of claim 1 wherein the concentration detector is one of a differential refractive index detector (dRI), an ultraviolet absorption detector, a visual absorption detector, an infrared absorption detector, a fluorescence detector, and an evaporative light scattering detector (ELSD).

3. The method of claim 1 wherein the viscometer is a differential viscometer.

4. The method of claim 1 wherein the first integral function is $$m_i = \int_{peak_i} c_{meas}(t)dt.$$

5. The method of claim 1 wherein the second integral function is $$I\eta_i = \int_{peak_i} \eta_{sp}(t)dt.$$

6. The method of claim 1 wherein the third integral function is $$I2\eta_i = \int_{peak_i} \eta_{sp}^2(t)dt.$$

7. The method of claim 1 wherein the fitting comprises a least squares fitting.

8. The method of claim 7 wherein the least squares fitting comprises a non-linear least squares fitting.

9. The method of claim 1 wherein the fitting function is $$m_i = \frac{1}{[\eta]}I\eta_i - \frac{K_h}{[\eta]}I2\eta_i.$$

10. The method of claim 1 further comprising executing, by the computer system, a set of logical operations calculating a figure of merit, FOM, characterizing a contribution of $K_h$ to fitting, as a ratio function of $K_h$, the second intermediate viscosity value of the each of the aliquots, $I2\eta_i$, and the first intermediate viscosity value of the each of the aliquots, $I\eta_i$.

11. The method of claim 10 wherein the ratio function is

FOM=$(K_h I2\eta_i)/I\eta_i$.

12. The method of claim 1 further comprising executing, by the computer system, a set of logical operations calculating a ratio of the first intermediate viscosity value of the each of the aliquots, $I\eta_i$, to the total mass of the each of the aliquots, $m_i$; and displaying, by the computer system, a plot of the calculated ratio of the each of the aliquots versus the total mass, $m_i$, of the each of the aliquots.

13. A system comprising:
a memory; and
a processor in communication with the memory, the processor configured to perform a method comprising
receiving concentration detector signal values over time, $c_{meas}(t)$, from a concentration detector,
wherein the concentration detector signal values correspond to concentration values of a series of aliquots of an unknown sample injected into an instrument chain,
wherein the instrument chain comprises the concentration detector,
receiving specific viscosity values over time, $\eta_{sp}(t)$, from a viscometer,
wherein the specific viscosity values correspond to the series of aliquots,
wherein the instrument chain further comprises the viscometer,
executing a set of logical operations calculating a total mass of each of the aliquots, $m_i$, as a first integral function of the received concentration detector signal values, $c_{meas}(t)$, corresponding to the each of the aliquots,
executing a set of logical operations calculating a first intermediate viscosity value of the each of the aliquots, $I\eta_i$, as a second integral function of the received specific viscosity values, $\eta_{sp}(t)$, corresponding to the each of the aliquots,
executing a set of logical operations calculating a second intermediate viscosity value of the each of the aliquots, $I2\eta_i$, as a third integral function of the received specific viscosity values, $\eta_{sp}(t)$, corresponding to the each of the aliquots, and
executing a set of logical operations fitting the total mass of the each of the aliquots, $m_i$, the first intermediate viscosity value of the each of the aliquots, $I\eta_i$, and the second intermediate viscosity value of the each of the aliquots, $I2\eta_i$, to a fitting function comprising the first integral function, a floating intrinsic viscosity of the unknown sample, [η], the second integral function, a floating Huggins constant of the unknown sample, $K_h$, and the third integral function, resulting in a calculated intrinsic viscosity of the unknown sample and a calculated Huggins constant of the unknown sample.

14. The system of claim 13 wherein the method further comprises
executing a set of logical operations calculating a figure of merit, FOM, characterizing a contribution of $K_h$ to fitting, as a ratio function of $K_h$, the second intermediate viscosity value of the each of the aliquots, $I2\eta_i$, and the first intermediate viscosity value of the each of the aliquots, $I\eta_i$.

15. The system of claim 14 wherein the ratio function is

FOM=$(K_h I2\eta_i)/I\eta_i$.

16. The system of claim 13 wherein the method further comprises:
executing a set of logical operations calculating a ratio of the first intermediate viscosity value of the each of the aliquots, $I\eta_i$, to the total mass of the each of the aliquots, $m_i$; and
displaying a plot of the calculated ratio of the each of the aliquots versus the total mass, $m_i$, of the each of the aliquots.

17. A non-transitory computer program product comprising a computer readable storage medium having program instructions embodied therewith, the program instructions executable by a processor to cause the processor to perform a method comprising:

receiving concentration detector signal values over time, $c_{meas}(t)$, from a concentration detector,
        wherein the concentration detector signal values correspond to concentration values of a series of aliquots of an unknown sample injected into an instrument chain,
        wherein the instrument chain comprises the concentration detector;
    receiving specific viscosity values over time, $\eta_{sp}(t)$, from a viscometer,
        wherein the specific viscosity values correspond to the series of aliquots,
        wherein the instrument chain further comprises the viscometer;
    executing a set of logical operations calculating a total mass of each of the aliquots, $m_i$, as a first integral function of the received concentration detector signal values, $c_{meas}(t)$, corresponding to the each of the aliquots;
    executing a set of logical operations calculating a first intermediate viscosity value of the each of the aliquots, $I\eta_i$, as a second integral function of the received specific viscosity values, $\eta_{sp}(t)$, corresponding to the each of the aliquots;
    executing a set of logical operations calculating a second intermediate viscosity value of the each of the aliquots, $I2\eta_i$, as a third integral function of the received specific viscosity values, $\eta_{sp}(t)$, corresponding to the each of the aliquots; and
    executing a set of logical operations fitting the total mass of the each of the aliquots, $m_i$, the first intermediate viscosity value of the each of the aliquots, $I\eta_i$, and the second intermediate viscosity value of the each of the aliquots, $I2\eta_i$, to a fitting function comprising the first integral function, a floating intrinsic viscosity of the unknown sample, $[\eta]$, the second integral function, a floating Huggins constant of the unknown sample, $K_h$, and the third integral function, resulting in a calculated intrinsic viscosity of the unknown sample and a calculated Huggins constant of the unknown sample.

18. The computer program product of claim 17 wherein the method further comprises executing a set of logical operations calculating a figure of merit, FOM, characterizing a contribution of $K_h$ to fitting, as a ratio function of $K_h$, the second intermediate viscosity value of the each of the aliquots, $I2\eta_i$, and the first intermediate viscosity value of the each of the aliquots, $I\eta_i$.

19. The computer program product of claim 18 wherein the ratio function is $$FOM = (K_h I2\eta_i)/I\eta_i.$$

20. The computer program product of claim 17 wherein the method further comprises:

executing a set of logical operations calculating a ratio of the first intermediate viscosity value of the each of the aliquots, $I\eta_i$, to the total mass of the each of the aliquots, $m_i$; and
    displaying a plot of the calculated ratio of the each of the aliquots versus the total mass, $m_i$, of the each of the aliquots.

\* \* \* \* \*